Feb. 23, 1937. H. R. SCHUTZ Re. 20,277

BANDING MACHINE

Original Filed Aug. 8, 1932 4 Sheets-Sheet 1

Inventor
Harold R. Schutz
Barnett & Lyman
Attorneys.

Feb. 23, 1937. H. R. SCHUTZ Re. 20,277

BANDING MACHINE

Original Filed Aug. 8, 1932 4 Sheets-Sheet 2

Inventor
Harold R. Schutz
Barnett & Truman
Attorneys.

Feb. 23, 1937. H. R. SCHUTZ Re. 20,277

BANDING MACHINE

Original Filed Aug. 8, 1932 4 Sheets-Sheet 3

Inventor

Harold R. Schutz

By Barnett & Duncan

Attorneys

Feb. 23, 1937. H. R. SCHUTZ Re. 20,277
BANDING MACHINE
Original Filed Aug. 8, 1932 4 Sheets-Sheet 4
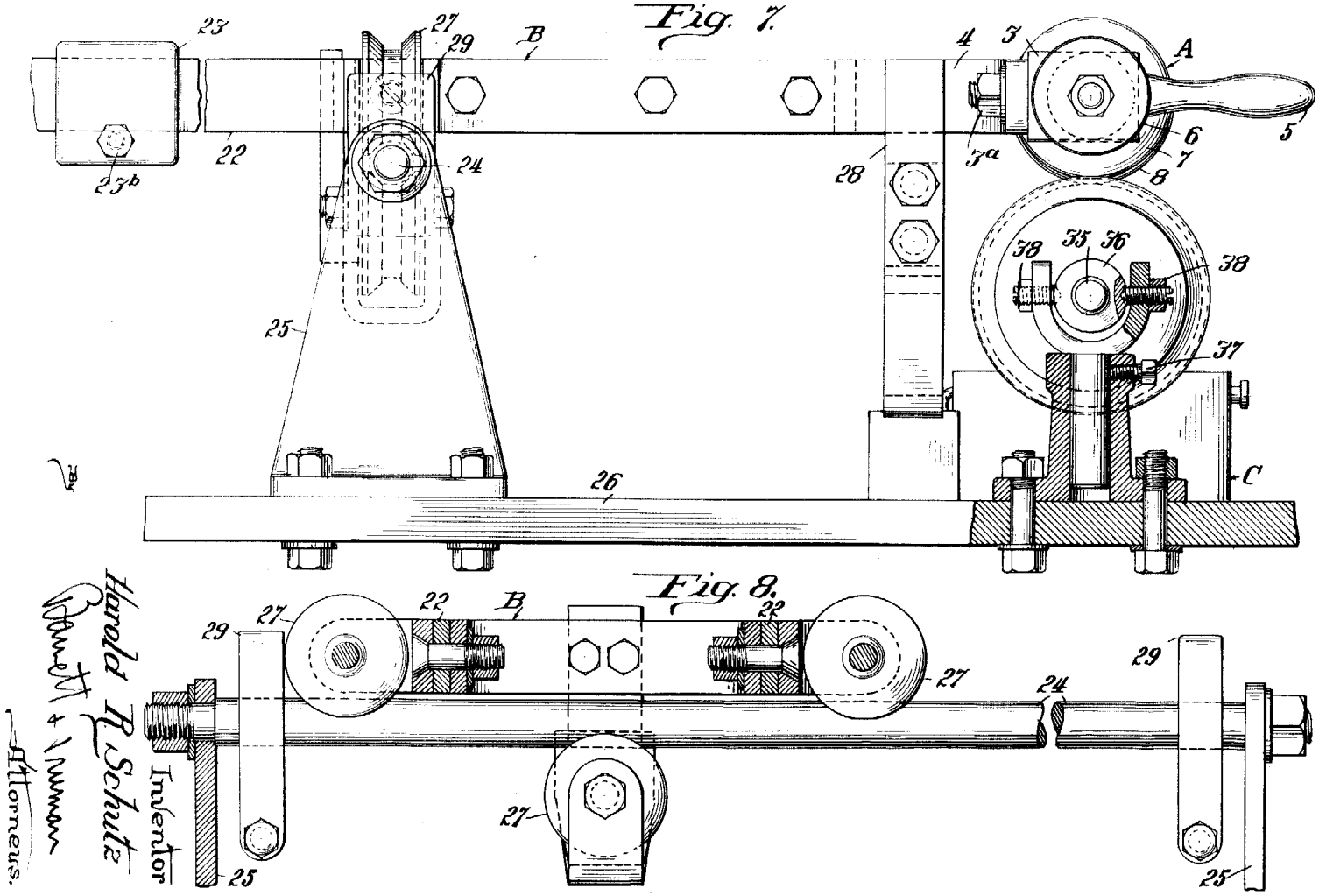

Reissued Feb. 23, 1937

Re. 20,277

UNITED STATES PATENT OFFICE 20,277

BANDING MACHINE

Harold R. Schutz, Ottawa Hills, Ohio, assignor, by mesne assignments, to Libbey Glass Company, Toledo, Ohio, a corporation of Ohio Original No. 1,985,800, dated December 25, 1934, Serial No. 627,902, August 8, 1932. Application for reissue March 19, 1935, Serial No. 11,898

14 Claims. (Cl. 91—12)

This invention relates to new and useful improvements in a machine adapted to paint various colored and spaced bands on drinking tumblers or similar articles. As a new decorative idea it is now popular to ornament drinking glasses with a series of spaced painted bands extending around the periphery of the glass. These bands may be equally or unequally spaced and may be of similar or contrasting colors, according to taste. To perform this work by hand is tedious and difficult and necessitates a much higher price being charged for the finished article.

The primary object of the invention herein described is to provide a machine which will neatly and effectively perform this function and which is practically automatic, so that a person with no particular skill can operate it and so decorate many tumblers in a minimum of time.

Another object is to provide an adjustable mechanism whereby painted bands may be placed around the periphery of a tumbler in predetermined spaced relationship.

Still another object is to provide such a machine whereby such bands may be so placed in predetermined color combinations.

A further object is to provide novel means for agitating the paint contained in the reservoirs so as to maintain a constant smooth mixture.

Another object is to provide novel yieldable paint applying discs whereby any slight differences in the surfaces of the tumbler or the discs is compensated for.

Still a further object is to provide a cushioned chuck for holding tumblers to be so decorated and a stop member adjacent said chuck whereby the relative position of the tumblers and the paint applying discs is constant.

Another object is to provide means for manually rotating the tumbler after the paint has been applied so as to smooth out any gobs of paint which may collect on the decorated area. Although herein is disclosed subject matter forming a basis for claims directed to the method of forming a band on a tumbler comprising spinning the chuck carrying the article after the band has been applied so as to smooth the applied band, election is made to make such claims in applicant's copending application Serial No. 18,571 directed to banding machines.

Another object is to provide a lock means for holding the tumbler on the chuck.

Further objects and advantages will be apparent from the drawings and the following detailed description.

In the drawings:

Fig. 7 is an end elevation partially broken away.

Fig. 8 is a vertical sectional view taken along line 8—8 of Fig. 1.

Figure 1:
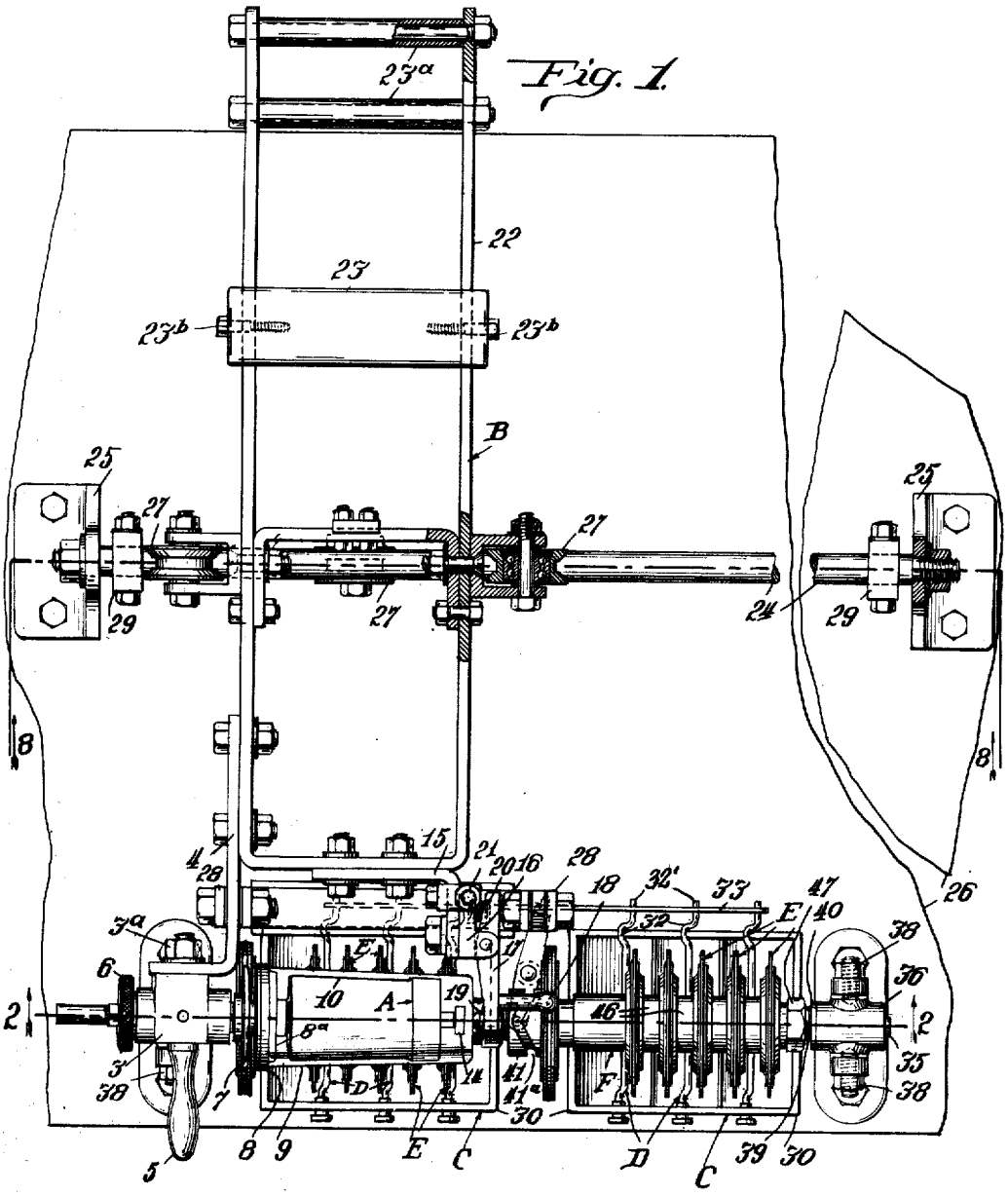
Fig. 1 is a plan view of the banding machine.

The banding machine comprises generally a chuck assembly A for receiving and rotating the tumblers to be decorated, a carriage member B on one end of which is mounted the chuck assembly A and which is pivotable vertically and movable horizontally, a plurality of paint reservoirs C adapted to contain paint, enamel or other coloring matter, paint agitators D and a series of paint applying discs E, rotatably mounted on a shaft assembly F between the chuck assembly A and the paint reservoirs C.

In detail the chuck assembly A comprises a shaft 1 rotatably mounted by means of ball bearing assembly 2 within the rectangular block 3 which is adjustably secured by means of stud and nut 3a to arm 4 extending from one end of the carriage member B and which also carries handle 5. On one end of shaft 1 adjacent block 3 is a knurled wheel 6 for manually rotating the shaft and adjacent the other side of block 3 on shaft 1 is mounted a drive wheel 7. Adjacent wheel 7 is mounted a stop disc 8 adapted to contact with the rim of the tumbler 9 to limit longitudinal movement and a centering disc 8a adapted to contact the inner edge of the rim to insure true rotation of the tumbler. The chuck proper comprises a tapered cylinder 10 mounted on the shaft 1, its larger end towards stop member 8, and movable longitudinally with relation thereto. A helical spring 11 is positioned about the shaft 1 and fits within a seat 12 formed within chuck 10 and is adapted to force chuck 10 away from stop member 8. A bolt 13 is secured within the other end of shaft 1, the enlarged circular head 14 thereof forming a stop adapted to prevent chuck 10 from being forced off the shaft 1 by spring 11.

A locking mechanism for holding the tumbler 9 on chuck 10 is provided and comprises a supporting arm 15 secured to the carriage member B and extending to a point adjacent the smaller end of chuck 10. Mounted on said arm so as to be vertically pivotable is a bracket 16 and on said bracket is mounted a locking lever 17 adapted to be slightly pivoted in a horizontal plane. Lever 17 carries a handle 18 and a spherically headed bearing member 19 adapted to contact the center of the bottom outside surface of the tumbler 9. A coiled spring 20 positioned between the other end of said lever 17 and bracket 16 causes the bearing member 19 to press against the tumbler. An adjustable screw and lock nut assembly 21 provides a stop means for limiting the downward pivotal movement of bracket 16. Thus by means of handle 18 the lever 17 may be moved horizontally a slight distance so as to bring bearing member 19 out of contact with the bottom of tumbler 9 and then swing upwardly together with the bracket 16 so that the tumbler 9 may be removed and another one placed on chuck 10.

The carriage member B comprises a rectangular frame 22 on one end of which are mounted the chuck assembly and locking mechanism as hereinabove described, and on the other end of which is slidably mounted a counterweight 23 and spacers 23*a*. Clamp screws 23*b* lock counterweight 23 in proper position. A cylindrical track or rod 24 is mounted at right angles to frame 22 and parallel to chuck assembly A by means of vertical brackets 25 bolted on the base 26 of the machine. Frame 22 is mounted on track 24 so as to be vertically pivotable and horizontally movable from one of its two alternative operative positions to the other by means of three flanged wheels 27 secured to frame 22 between its ends. The wheels are in the same vertical plane but two of them ride on the top surface of rod 24 and the other is positioned below said rod and between the other two. Two similar bifurcated support members 28 are vertically mounted on base 26, one adjacent the chuck assembly carrying end of carriage member B in each of its operative positions and adapted to receive arm 4 of frame 22 to prevent horizontal movement of frame 22 when in operating position. Stop members 29 are positioned at each end of track 24 to limit the length of track over which frame 22 can be horizontally moved so that one of the support members 28 and arm 4 are aligned at each terminal point. Thus it is clear that by grasping handle 5 the entire chuck assembly may be lifted upwards (the frame 22 pivoting about rod 24) and then moved horizontally between the two stop members 29 on the track 24. The bifurcated supports 28 provide two positions in which the chuck assembly can be held against horizontal movement.

Parallel to track 24 and vertically aligned with the longitudinal axis of chuck assembly A are a plurality of reservoirs C, comprising rectangular containers 30 adapted to receive paint or enamel of different colors.

Depending in said reservoirs 30 are a plurality of fins or paint agitators 31 mounted on shafts 32 which are journaled in the sides of the reservoirs. These shafts have crank arms 32′ on one end which are joined together by a connecting rod 33 which is operated by an oscillating lever 34 as hereinafter explained.

Between the reservoirs 30 and chuck assembly A is positioned shaft assembly F comprising the main shaft 35 journaled in the adjustable bearing assemblies 36 which provide vertical adjustments by means of set screw 37 and horizontal adjustment by means of screws and nuts 38. The diameter of shaft 35 is greater between bearings 36, the ends of said enlarged part being threaded as at 39 and washers 40, positioned between the ends of said enlarged parts and the bearings 36, serve as thrust bearings. The shaft 35 extends beyond one of said bearings 36 and is rotated by any desired source of power. Approximately midway between the bearings 36 and directly above lever 34 there is mounted on shaft 35 a cylinder 41 having a continuous cam groove 41*a* in its outer surface. A pin 42 extends upwardly from one end of lever 34 and into the cam groove of cylinder 41. When shaft 35 rotates the diagonal cam groove changes position causing lever 34 to oscillate. Sleeves 43 are mounted on said shaft 35 at each side of cylinder 41 and are secured so as to rotate with the shaft by means of nuts 44 screwed on the threaded portions 39 of the shaft. Also mounted on shaft 35 and adjacent the ends of reservoirs 30 are grooved soft rubber wheels 45 which are engaged by the drive wheel 7 on the chuck and are yieldable vertically to allow a tumbler on chuck 10 to be moved into full contact with discs E. The paint applying discs E are mounted on the sleeves 43 of the shaft 35, are spaced as desired by spacing members 46 and are secured in such position by nuts 47 tightened on the threaded ends 48 of sleeves 43.

Paint applying discs E each comprises a steel ring 49, the outer peripheral surface of the ring having a width corresponding approximately to the width of the band to be painted on the tumbler. The ring 49 is held frictionally between a pair of discs 50 screwed to a hub 51, the hub and discs being clamped on sleeve 43 between a pair of spacing sleeves 46. Positioned between the hub 51 and the ring 49 is a curved band spring 52. By this construction the paint applying discs E are yieldable and accordingly align themselves to the surface of the periphery of the tumbler to be banded and automatically compensate for any irregularities in the surface of the tumbler and for any unequal wear in the edges of the discs.

Figure 9:
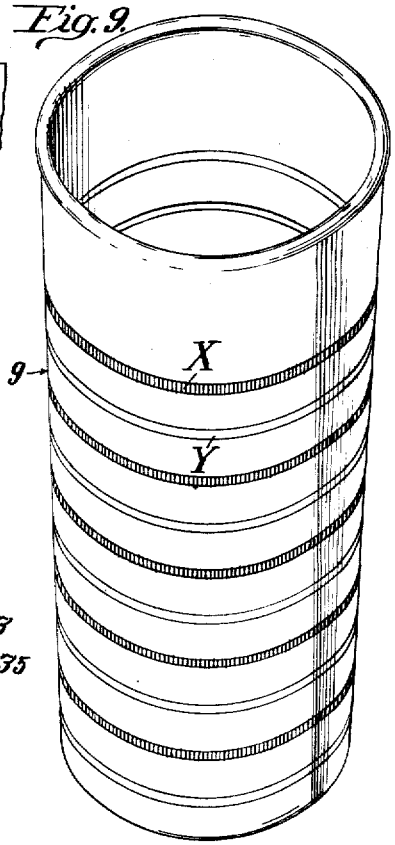
Fig. 9 is a perspective view of a tumbler decorated in accordance with this invention.
Figure 5:
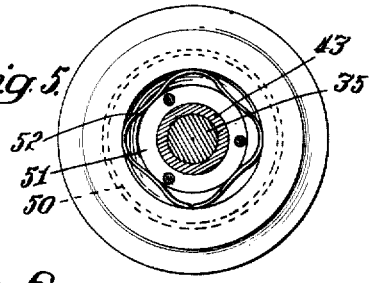
Fig. 5 is a vertical sectional view taken along line 5—5 of Fig. 2.
Figure 6:
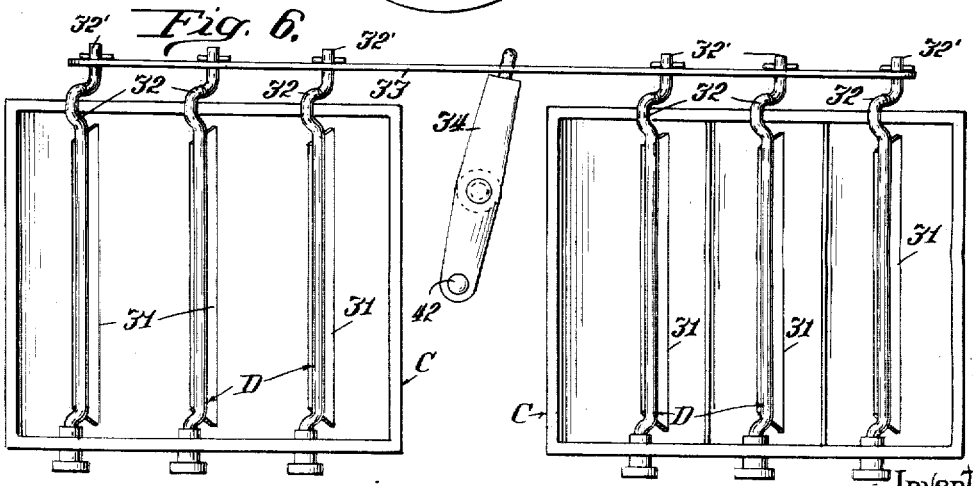
Fig. 6 is a plan view of the paint reservoirs and agitating mechanism.

In operation: The reservoirs are filled with paint or enamel of the colors desired. The paint applying discs are arranged on the main shaft in number and position according to design to be placed on tumbler. The chuck assembly is swung up out of contact with the discs and a tumbler is placed on chuck 10 which has been angularly adjusted by stud and nut 3*a* in accordance with the taper of the tumbler and the tumbler and chuck moved in against spring 11 until the rim of the tumbler contacts stop member 8 and the inner edge of the rim contacts the centering disc 8*a*. Then the locking mechanism is pivoted downwardly until bearing member 19 is substantially opposite the center of the bottom of the glass, the screw and nut means 21 being adjusted to stop the locking mechanism when swung down to this position. Locking lever 17 is then allowed to swing horizontally by spring 20, thus causing bearing member 19 to contact the base of the tumbler. The chuck assembly is then pivoted downwardly, arm 4 fitting within bifurcated member 28, drive wheel 7 within one of the yieldable grooved wheels 45 which yieldably limits downward movement and also rotates the chuck, and the constantly rotating paint applying discs contacting the periphery of the tumbler. Due to the friction between drive wheel 7 and grooved wheel 45, chuck 10 and tumbler 9 are caused to rotate. The discs moving through the paint reservoirs pick up paint and transfer it to the side of the tumbler as they rotate against it. As soon as the banding has been thus completed from one reservoir the chuck is swung upwardly by means of handle 5, taking the tumbler out of contact with the discs and the knurled wheel 6 is manually rotated to spin the tumbler and smooth out any gobs of paint left by the discs. This first operation has produced the bands of any desired color as indicated by X in Fig. 9. The chuck assembly is then manually moved horizontally by means of carriage member B until the tumbler is above the second reservoir at which point it is swung down, arm 4 fitting within the next member 28 and drive wheel 7 on the next grooved wheel 45, the second series of discs contacting the periphery of the tumbler between the bands heretofore made or according to their spacing. The second reservoir being filled with different colored paint, different colored bands result when the discs are rotated against the tumbler. Thus a second series of bands is applied to the tumbler of a color different than that of the first series such as illustrated by Y, Fig. 9.

Figures 2, 3:
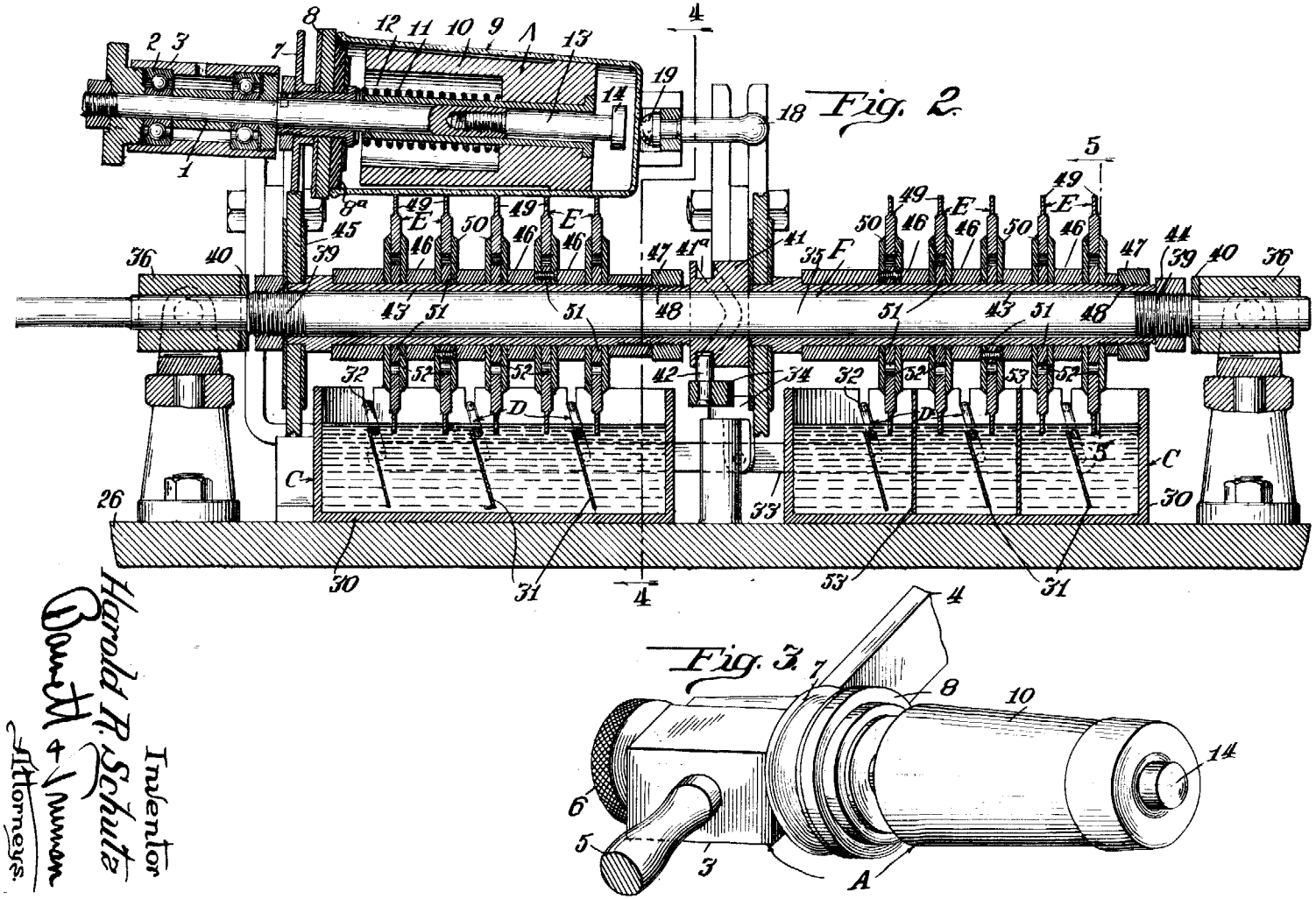
Fig. 2 is a vertical sectional view taken on line 2—2 of Fig. 1.
Fig. 3 is an enlarged perspective of the chuck mechanism.
Figure 4:
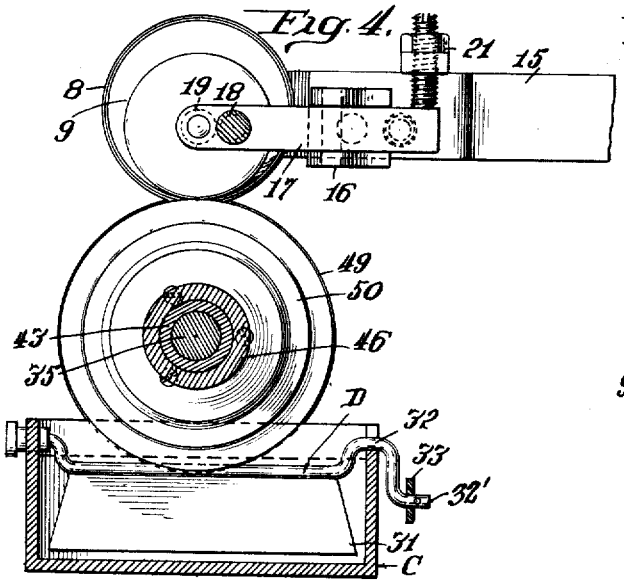
Fig. 4 is a vertical sectional view taken along line 4—4 of Fig. 2.

It is obvious that many different designs can be so produced, the number of colors being determined by the number of paint reservoirs, the number of bands by the number of discs and the design by spacing and relative position of the various series of discs. Should additional colors be desired without adding to the number of reservoirs it is entirely practical to supply partitions for the reservoirs (as indicated at 53 in the right hand reservoir shown in Fig. 2), dividing them into sections, each section adapted to receive a differently colored paint.

The cushioned chuck 10 and stop member 8 enable the bands to be applied uniformly to all tumblers of the same size, for when the rims of tumblers applied to the chuck 10 contact the stop 8 and are held in that position by the locking mechanism the relative position of the tumbler and the paint applying discs is always the same.

I claim:

1. A banding machine comprising a support adapted to rotatably support an article, a plurality of paint reservoirs, a plurality of series of paint applying discs adapted to rotate against said article and in said reservoirs, and a carriage vertically pivotal and horizontally movable on which said support is mounted whereby said chuck can be moved successively to points adjacent each series of discs and against the discs of such series.

2. A banding machine comprising a support adapted to rotatably support an article, a plurality of paint reservoirs, a plurality of series of paint applying discs adapted to rotate against said article and in said reservoirs, a vertically pivotal and horizontally movable carriage, said support being mounted on said carriage and stop members limiting the movement of said carriage.

3. A banding machine comprising a chuck, a plurality of paint reservoirs, a rotatable shaft, a plurality of series of paint applying discs mounted on said shaft, one series extending into each of said reservoirs, a carriage, said chuck being mounted on said carriage, said carriage adapted to be moved horizontally so as to place said chuck adjacent any one of said series of discs optionally and adapted to be pivoted vertically so as to be moved toward the series of discs.

4. A machine for applying bands of paint to the periphery of a glass article comprising a chuck, a paint reservoir, a rotatable shaft mounted between said chuck and said reservoir, a plurality of paint applying discs mounted on said shaft, a plurality of agitators for mixing the contents of said reservoir comprising fins depending in said reservoir and oscillatably mounted, a cylinder mounted on said shaft, there being a cam groove in said cylinder, a lever, a pin extending from said lever into said cam groove and connecting means between said lever and said agitators whereby said agitators are caused to oscillate when said shaft is rotated.

5. A machine for applying bands of paint to the periphery of a glass article comprising a chuck, a paint reservoir, a rotatable shaft mounted between said chuck and said reservoir, a plurality of paint applying discs mounted on said shaft, a plurality of agitators for mixing the contents of said reservoir comprising a plurality of horizontal shafts mounted on said reservoir, fins depending from said shafts, crank arms on the ends of said shafts, a connecting arm joining all of said crank arms, a cylinder having a cam groove therein mounted on said rotatable shaft, a lever, a pin extending from said lever into said cam groove, said lever being operably joined to said connecting arm whereby said agitators are caused to oscillate when said shaft is rotated.

6. A machine for applying colored bands to the periphery of an article comprising an angularly adjustable chuck, a carriage assembly comprising a frame, wheels mounted on said frame, a horizontal track, said wheels engaging opposite sides of said track, said frame vertically pivotable about said track, a counterweight on one end of said frame, said chuck being mounted on the other end of said frame, a series of paint reservoirs, a rotatable shaft, a series of paint applying discs mounted on said shaft adjacent each of said reservoirs and extending therein, said carriage adapted to carry said chuck adjacent each of said series of discs.

7. In a banding machine, a chuck assembly comprising a rotatable shaft, a chuck, a hand wheel and a drive wheel all mounted on said shaft, a paint reservoir, a main rotatable shaft, paint applying discs mounted on said main shaft, a wheel mounted on said main shaft adapted to contact said drive wheel to rotate said chuck, said chuck assembly being adapted to be swung away from said wheel.

8. A banding machine comprising a support, a series of reservoirs, a rotatable shaft, a plurality of series of paint applying discs mounted on said shaft, one series extending into each of said reservoirs, means for moving said support to points adjacent each of said series of discs and means for holding said support in each of said positions.

9. A banding machine comprising a support, a series of reservoirs, a rotatable shaft, a plurality of series of paint applying discs mounted on said shaft, one series extending into each of said reservoirs, a vertically oscillatable and horizontally movable carriage comprising a frame, an arm extending from said frame, said support mounted on said arm, said carriage adapted to move said support to points adjacent each of said series of discs and means for holding said carriage against horizontal movement in each of said positions.

10. A banding machine comprising a chuck, a series of reservoirs, a rotatable shaft, a plurality of series of paint applying discs mounted on said shaft, one series extending into each of said reservoirs, a vertically oscillatable and horizontally movable carriage comprising a frame, an arm extending from said frame, said chuck adjustably mounted on said arm, said carriage adapted to move said chuck to points adjacent each of said series of discs and means for holding said carriage against horizontal movement in each of said positions comprising vertically mounted bifurcated members adapted to receive said arm.

11. A banding machine comprising a chuck assembly comprising a rotatable shaft, a chuck, a drive wheel mounted on said shaft, a series of reservoirs, a rotatable main shaft, a plurality of yieldable wheels mounted on said shaft, a plurality of series of paint applying discs mounted on said shaft, one series extending into each of said reservoirs, a vertically oscillatable and horizontally movable carriage, said chuck assembly adjustably mounted on said carriage, said carriage adapted to move said chuck to points adjacent each of said series of discs, means for holding said carriage against horizontal movement in each of said positions, said drive wheel contacting one of said other yieldable wheels at each such position to limit downward movement of said carriage and to rotate said chuck.

12. In a banding machine, a chuck assembly comprising a rotatable shaft, a chuck mounted on said shaft and movable longitudinally thereon, yieldable means for resisting longitudinal movement, stop means for limiting such movement and means adapted to hold an article on said chuck.

13. In a banding machine, a chuck assembly comprising a rotatable shaft, a chuck mounted on said shaft and movable longitudinally thereon, a paint reservoir, a main rotatable shaft positioned between said chuck assembly and said reservoir, paint applying discs mounted on said main shaft and means whereby said chuck can be rotated by said main shaft comprising engaging discs mounted on said respective shafts.

14. A banding machine comprising a support adapted to rotatably support an article to be banded, a plurality of paint reservoirs, a plurality of series of paint applying disks adapted to rotate against said article and in said reservoirs respectively, and vertically and horizontally movable means on which said support is mounted whereby said support can be moved successively to points adjacent each series of disks and to present the article thereon against the disks of each series.

HAROLD R. SCHUTZ.

CERTIFICATE OF CORRECTION.

Reissue No. 20,277. February 23, 1937.

HAROLD R. SCHUTZ.

It is hereby certified that error appears in the printed specification of the above numbered patent requiring correction as follows: Page 3, first column, line 52, claim 1, for the word "chuck" read support; and that the said Letters Patent should be read with this correction therein that the same may conform to the record of the case in the Patent Office.

Signed and sealed this 6th day of April, A. D. 1937.

Henry Van Arsdale
Acting Commissioner of Patents.

(Seal)